United States Patent [19]

Isobe et al.

[11] Patent Number: 5,242,752

[45] Date of Patent: Sep. 7, 1993

[54] MAGNETIC RECORDING MEDIUM COMPRISING A SPECIFIED BINDER RESIN, SPECIFIED FERROMAGNETIC METAL POWDER AND α-ALUMINA

[75] Inventors: Ryosuke Isobe; Noboru Koyama; Kenji Itozawa; Takahiro Mori, all of Hino, Japan

[73] Assignee: Konica Corporation, Tokyo, Japan

[21] Appl. No.: 787,736

[22] Filed: Nov. 4, 1991

Related U.S. Application Data

[63] Continuation of Ser. No. 336,239, Apr. 11, 1989, abandoned.

[30] Foreign Application Priority Data

Apr. 14, 1988 [JP] Japan .................. 63-92566

[51] Int. Cl.$^5$ .................. G11B 5/00
[52] U.S. Cl. .................. 428/329; 428/403; 428/412; 428/425.9; 428/480; 428/522; 428/694 B; 428/900; 428/694 BG; 428/694 BN; 428/694 BA; 428/694 BP
[58] Field of Search ............ 428/694, 900, 695, 425.9, 428/328, 329, 403, 412, 480, 522

[56] References Cited

U.S. PATENT DOCUMENTS

| | | | |
|---|---|---|---|
| 4,569,856 | 2/1986 | Miyoshi et al. | 427/128 |
| 4,687,703 | 8/1987 | Miyoshi et al. | 428/323 |
| 4,690,863 | 9/1987 | Miyoshi et al. | 428/328 |
| 4,731,292 | 3/1988 | Sasaki et al. | 428/425.9 |
| 4,743,501 | 5/1988 | Eguchi et al. | 428/328 |
| 4,784,907 | 11/1988 | Matsufuji et al. | 428/328 |
| 4,784,914 | 11/1988 | Matsufuji et al. | 428/418 |
| 4,803,121 | 2/1989 | Ryoke et al. | 428/329 |
| 4,803,131 | 2/1989 | Saito et al. | 428/694 |

FOREIGN PATENT DOCUMENTS

59-221830 12/1984 Japan .

OTHER PUBLICATIONS

Patent Abstracts of Japan, vol. 10 No. 361 (p. 523); Dec. 4, 1986 JPA-61-158023; Jul. 17, 1986.
Patent Abstracts of Japan, vol. 12 No. 68 (p. 672); Mar. 3, 1988 JPA-62-208423; Sep. 12, 1987.

*Primary Examiner*—Paul J. Thibodeau
*Assistant Examiner*—Stevan A. Resan
*Attorney, Agent, or Firm*—Jordan B. Bierman

[57] ABSTRACT

A magnetic recording medium having a support and provided thereon, a magnetic layer containing a ferromagnetic metal powder and a binder is disclosed. The ferromagnetic powder comprises an adsorbed moisture of not less than 1.0 weight % and not more than 2.5 weight % of said ferromagnetic metal powder, a pH value of not less than 9.0 and not morer than 11.5, and a specific surface area of not less than 45 m$^2$/g measured by a BET method; and the binder comprises at least one polar group selected from the group consisting of:

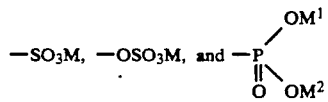

wherein M represents an atom selected from the group consisting of hydrogen, lithium, sodium, and potassium; and M$^1$ and M$^2$ represent atoms of hydrogen, lithium, sodium and potassium, and an alkyl group, provided that M$^1$ and M$^2$ may be same with or different from each other.

18 Claims, No Drawings

MAGNETIC RECORDING MEDIUM COMPRISING A SPECIFIED BINDER RESIN, SPECIFIED FERROMAGNETIC METAL POWDER AND α-ALUMINA

This application is a continuation of U.S. patent application No. 07/336,239, filed Apr. 11, 1989, now abandoned.

FIELD OF THE INVENTION

This invention relates to a magnetic recording medium applicable to a video tape, an audio tape and so forth and, more particularly, to a magnetic recording medium containing a ferromagnetic metal powder, which can be stably manufactured because of good dispersibility of a ferromagnetic powder and is excellent in running durability and electromagnetic conversion characteristics, so that the magnetic recording medium can suitably be used for a high density recording.

BACKGROUND OF THE INVENTION

Recently in audio field, a digital audio tape recorder (DAT) has appeared on the market, and in VTR field, an 8 mm tape that is narrower than a conventional half-inch width tape has appeared and is getting popular now. Under the above-mentioned circumstances, the magnetic recording media capable of higher density recording are required increasingly. There is growing a demand for a magnetic recording medium having high efficiency, namely, excellent electromagnetic conversion characteristics and running durability.

In order to meet the foregoing requirement to improve the electromagnetic conversion characteristics of magnetic recording media, a fine ferromagnetic powder has come to be used, however, it still has a poor dispersibility problem when used in magnetic layers.

To be more concrete, the magnetic recording media containing fine ferromagnetic powder have the following problems; (1) electromagnetic conversion characteristics are not necessarily satisfactory; (2) a part of ferromagnetic powder particles of poor dispersion is liable to drop out during a running operation; (3) a part of particles dropped out in travelling is liable to adhere momentarily to a magnetic head and cause the so-called 'instant head clog', which is then liable to reduce a reproducing output; and so forth.

To solve the above-mentioned problems, there have been proposed the magnetic recording media, for example, comprising ferromagnetic metal powder having an adsorbed moisture of not more than 1.2 wt %, which is disclosed in Japanese Patent Publication Open to Public Inspection (hereinafter referred to as Japanese Patent O.P.I. Publication) No. 61-8726/1986.

However, the above-given particular magnetic recording medium still has a problem of an increased viscosity of a magnetic paint.

To be more concrete, an increase in a viscosity of a magnetic paint will cause the following disadvantages, for example, (1) a magnetic paint is difficult to transfer smoothly in a transferring line in manufacturing magnetic recording media, and partial clogging of the paint in the transferring line is liable to happen; (2) such unstable production sometimes results in bad product quality such as drop out of a magnetic layer, which results in deterioration of electromagnetic conversion characteristics; (3) after coating a magnetic paint on a non-magnetic support in a coating step, it is difficult to carry out smoothly a surface smoothing process, and a surface smoothness of a magnetic recording medium is liable to be damaged as so seriously to cause head clogging, edge-fold or the like troubles and to lower a running durability of a recording medium; and so forth.

Such a magnetic recording medium is expected to be commercialized as having excellent running durability and electromagnetic conversion characteristics attributable to good dispersibility of a ferromagnetic metal powder and stable manufacturing.

Based upon the above-mentioned circumstances, this invention has been made.

It is, therefore, an object of the invention to provide a magnetic recording medium which can be manufactured stably because of good dispersibility of a ferromagnetic metal powder and comprises high electromagnetic conversion characteristics as well as an excellent durability.

DETAILED DESCRIPTION OF THE INVENTION

To solve the above-mentioned problems, the present inventors have devoted themselves to studying repeatedly. As the result, the inventors have finally achieved this invention upon finding out the facts that a magnetic recording medium comprising a ferromagnetic metal powder having a particular specific surface area and an adsorption moisture within a particular range and a binder containing a particular resin, is excellent in dispersibility of ferromagnetic metal powder, manufacturing stability, running durability and electromagnetic conversion characteristics, as well as suitably applicable to high density recording.

The magnetic recording medium of the invention is comprised of a non-magnetic support bearing thereon a magnetic layer containing a ferromagnetic metal powder and a binder, wherein an adsorbed moisture of the ferromagnetic metal powder is not less than 1.0 wt % to not more than 2.5 wt %, a specific surface area is not less than $45 m^2/g$ according to BET method, and the binder contains a resin having at least one polar group selected from the group consisting of

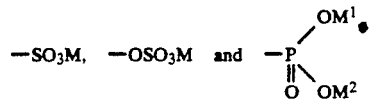

wherein M represents a hydrogen, lithium, sodium or potassium atom; $M^1$ and $M^2$ represent independently atoms of hydrogen atom, lithium, potassium and sodium, and an alkyl group, provided that $M^1$ and $M^2$ may be same with or different from each other.

Further, the magnetic recording medium of the invention is comprised of the above-mentioned ferromagnetic metal powder having a pH value of not lower than 9.0 and not higher than 11.5.

Non-magnetic support and magnetic layer each constituting the magnetic recording medium of the invention will be detailed below.

Non-magnetic support

The raw materials applicable to form the above-mentioned non-magnetic support include, for example, polyesters such as polyethylene terephthalate, polyethylene-2,6-naphthalate and so forth; polyolefins such as polypropylene and so forth; cellulose derivatives such as cellulose triacetate, cellulose diacetate and so forth; and plastics such as polycarbonate and so forth. Besides the above, it may also be allowed to use metals such as Al, Cu, Zn and so forth; glass; various types of ceramics including so-called new ceramics such as boron nitride, silicon carbide; and so forth.

There is no special limitation to the shapes of the above-mentioned non-magnetic supports. Those supports are therefore allowed to take any shape of tapes, sheets, cards, disks, drums and so forth, and various materials may selectively be used for those supports to meet the shapes or any other requirements. Further, such supports may have a shape of a cylinder in case of the drum, so as to make it compatible with a recorder used.

The thickness of a support is 3 to 100 μm, and preferably 3 to 50 μm in a tape or a sheet; and 30 to 100 μm in a disk or a card.

There may be provided on the other side of the support having no magnetic layer a back coat layer which can contribute to improving a running property and preventing electrification and transferring.

Further, there may be provided on the side having a magnetic layer an interlayer such as an adhesive layer, with the purposes of improving adhesion of the magnetic layer to the support.

Magnetic layer

A magnetic layer consists of a ferromagnetic metal powder dispersed in a binder.

One of the essential points of the invention is that an adsorbed moisture of the ferromagnetic metal powder is not less than 1.0 wt % and not more than 2.5 wt % and, a specific surface area thereof is not less than 45 m$^2$/g according to a BET method.

The ferromagnetic metal powder includes those principally comprising the powder of such a ferromagnetic metal as Fe, Ni, Co and the like, such as Fe-Al, Fe-Ni, Fe-Al-Ni, Fe-Al-P, Fe-Ni-Si-Al, Fe-Ni-Si-Al-Mn, Ni-Co, Fe-Mn-Zn, Fe-Ni-Zn, Fe-Co-Ni-Cr, Fe-Co-Ni-P, Co-Ni, Co-P and the like.

Among them, aluminium and/or nickel containing metal powder such as Fe-Al, Fe-Al-P, Fe-Ni, Fe-Al-Ni, Fe-Ni-Zn and the like is preferable; and metal powder having an alminium content of 1 to 18 wt % is particularly preferable because aluminium and/or nickel containing metal powder has an excellent weatherability.

Adsorbed moisture of the ferromagnetic metal powder is not less than 1.0 wt % and not more than 2.5 wt % of the ferromagnetic metal powder, and preferably not less than 1.0 wt % and not more than 2.0 wt %.

Moisture adsorption of the above-specified range to the ferromagnetic metal powder improves dispersibility of the magnetic powder in a magnetic paint and prevent a viscosity increase of the magnetic paint, so that manufacturing stability is also improved. Further, adhesion of the ferromagnetic metal powder to the binder can be improved, so that a running durability of a magnetic recording medium can also be improved.

An adsorbed moisture of the ferromagnetic metal powder can be adjusted to the above-specified range by leaving the powder in a prescribed vapor atmosphere.

The adsorbed moisture is measured by Karl Fischer's method in the invention.

If the adsorbed moisture of the ferromagnetic metal powder is less than 1.0 wt %, a pot-life stability of a magnetic paint is lowered. As the result, a head-clog or edge-fold is liable to occur, so that a running durability of the recording medium is deteriorated. On the other hand, the adsorbed moisture exceeding 2.5 wt % is liable to deteriorate dispersibility of the ferromagnetic metal powder in a magnetic layer.

A specific surface area of the ferromagnetic metal powder preferably is not less than 45 m$^2$/g and more preferably not less than 50 m$^2$/g according to BET method. The ferromagnetic metal powder having the specific surface area of not less than 45 m$^2$/g increases a loading density thereof and improves electromagnetic conversion characteristics. If the specific surface area of the ferromagnetic metal powder is less than 45 wt %, the electromagnetic conversion characteristics of a magnetic recording medium may not always be satisfactory.

In this invention, pH of the ferromagnetic metal powder is preferably not lower than 9.0 and not higher than 11.5, and more preferably not lower than 9.5 and not higher than 10.5.

The pH value of the ferromagnetic metal powder adjusted to the above-specified range can improve a running durability and electromagnetic conversion characteristics of a magnetic recording medium.

pH of the ferromagnetic metal powder can be adjusted to the above-specified range by adjusting an aluminium content in the ferromagnetic metal powder to 2 to 10 wt % and more preferably 2 to 8 wt %.

The pH value was measured in the following manner.

One hundred milliliters of distilled water added to 4 g of magnetic metal powder is stirred violently for 5 minutes by a homogenizer. There is used distilled water which is boiled to remove $CO_2$ and has pH of at least 5.5. pH should be in no way adjusted higher by adding an alkaline solution.

When measuring pH, stirring is stopped and then pH of a solution is measured with a glass electrode pH meter which is to be adjusted in advance by making use of a buffer solution.

There is no special limitation to the shapes of the ferromagnetic metal powder. For example, those of a needle, a globule, an ellipse and the like can be used.

Another one of the essential points of the invention is that a binder comprises of a resin having a polar group [hereinafter called a resin (A)].

Together with the ferromagnetic metal powder containing an adsorbed moisture of the aforementioned range, the above-mentioned resin (A) can contribute to improve dispersibility of the ferromagnetic metal powder in a magnetic layer and electromagnetic conversion characteristics.

The resin (A) is comprised of a resin having at least one polar group selected from

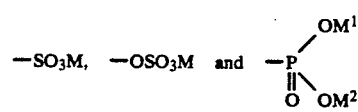

wherein M represents a hydrogen, lithium, sodium or potassium atom; $M^1$ and $M^2$ represent independently atoms of hydrogen, lithium, potassium and sodium, and an alkyl group, provided that $M^1$ and $M^2$ may be same with or different from each other.

The resins constituting the resin (A) include, for example, vinyl chloride resin, polyurethane resin, polyester resin, polycarbonate resin and so forth.

The above-mentioned resins can be prepared in various methods. For example, polyester resin containing a metal sulfonate group can be prepared in such a manner that dicarboxylic acid containing a metal sulfonate group as a part of dicarboxylic acid and dicarboxylic acid containing no metal sulfonate group are condensed with diol.

Polyurethane resins containing a metal sulfonate group can be prepared in such a manner that isocyanate and the three kinds of starting compounds for preparing the above-mentioned polyesters containing a metal sulfonate group, namely, dicarboxylic acids with and without a metal sulfonate group and diol, are subjected to an addition reaction.

Further, a polar group can be introduced by modifying polyester resin, polyurethane resin or vinyl chloride resin.

To be more concrete, the polar group can be introduced by a dehydrochlorination reaction of the above-given resin and a compound containing, in its own molecule, chlorine and one of the following polar groups: Cl—CH$_2$CH$_2$SO$_3$M,

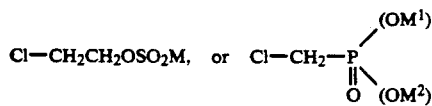

Cl—CH$_2$CH$_2$OSO$_2$M, or (wherein m, m$^1$ and m$^2$ are each synonymous with those given in the foregoing polar groups).

The carboxylic acid components used for preparing polyester resin or polyurethane resin include, for example, aromatic dicarboxylic acids such as terephthalic acid, isophthalic acid, orthophthalic acid, 1,5-naphthalic acid and so forth; aromatic oxycarboxylic acids such as p-oxybenzoic acid, p-(hydroxyethoxy)benzoic acid and so forth; aliphatic dicarboxylic acids such as succinic acid, adipic acid, azelaic acid, sebacic acid, dodecanedicarboxylic acid and so forth; and tri- and tetra-carboxylic acids such as trimellitic acid, trimesic acid, pyromellitic acid and so forth.

Among them, the preferable ones include terephthalic acid, isophthalic acid, adipic acid, and sebacic acid.

The dicarboxylic acid component containing the foregoing metal sulfonate group includes, for example, 5-sodiumsulfoisophthalic acid, 5-potassiumsulfoisophthalic acid, 2-sodiumsulfoterephthalic acid, 2-potassiumsulfoterephthalic acid and so forth.

The foregoing diol component includes, for example, ethylene glycol, propylene glycol, 1,3-propane diol, 1,4-butane diol, 1,5-pentane diol, 1,6-hexane diol, neopentyl glycol, diethylene glycol, dipropylene glycol, 2,2,4-trimethyl-1,3-pentane diol, 1,4-cyclohexane dimethanol, ethylene oxide adduct of bisphenol A, ethylene oxide adduct of hydrogenated bisphenol A, polyethylene glycol, polypropylene glycol, polytetramethylene glycol and so forth. Further, tri- and/or tetra-ols such as trimethylol ethane, trimethylol propane, glycerol, pentaerythritol and so forth may also be used in combination.

The above-mentioned isocyanate components used to prepare polyurethane resin include, for example, 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 4,4'-diisocyanate-diphenyl ether, 1,3-naphthalene diisocyanate, p-xylylene dicyanate, m-xylylene diisocyanate. 1,3-diisocyanate methylcyclohexane, 1,4-diisocyanate methylcyclohexane, 4,4'-diisocyanate dicyclohexane, 4,4'-diisocyanate dicyclohexylmethane, isophorone diisocyanate and so forth.

In the case where a metal sulfonate group is introduced by modifying vinyl chloride resin, the vinyl chloride resins applicable thereto include, for example, vinyl chloride-vinyl acetate-vinyl alcohol copolymer, vinyl chloride-vinyl propionate-vinyl alcohol copolymer, vinyl chloride-vinyl acetate-vinyl maleate-vinyl alcohol copolymer, vinyl chloride-vinyl propionate-vinyl maleate-vinyl alcohol copolymer and so forth.

There can be introduced a polar group by a dehydrochlorination reaction of OH of vinyl alcohol contained in the above-mentioned copolymer and chlorine of the metal sulfonate such as Cl—CH$_2$CH$_2$SO$_3$M, Cl—CH$_2$CHOSO$_3$M and so forth, in a polar solvent such as dimethyl formamide, dimethyl sulfoxide and so forth, in the presence of a dehydrochlorinating agent such as pyridine, picoline, triethylamine, ethylene oxide, propylene oxide and so forth.

Among the above-given resin (A). the preferable one is a vinyl chloride copolymer.

The above-mentioned vinyl chloride copolymer can be prepared by copolymerizing vinyl chloride monomer, copolymeric monomer having an alkali salt of a sulfonic acid or phosphoric acid group and, if required, other copolymeric monomers. As these copolymers are prepared by vinyl polymerization, they can readily be synthesized, and further the characteristics of copolymers can be adjusted to the optimum level by selecting various copolymer components.

Metals of the above-mentioned sulfonates or phosphates are alkali metals, particularly sodium, potassium or lithium. Among them, potassium is preferable from a viewpoint of solubility, reactivity, yield and so forth.

The copolymeric monomers containing sulfonates include, for example, the following monomers:
CH$_2$=CHSO$_3$M,
CH$_2$=CHCH$_2$SO$_3$M,
CH$_2$=C(CH$_3$)CH$_2$SO$_3$M,
CH$_2$=CHCH$_2$OCOCH(CH$_2$COOR)SO$_3$M,
CH$_2$=CHCH$_2$OCH$_2$CH(OH)CH$_2$SO$_3$M,
CH$_2$=C(CH$_3$)COOC$_2$H$_4$SO$_3$M,
CH$_2$=CHCOOC$_4$H$_8$SO$_3$M,
CH$_2$=CHCONHC(CH$_3$)$_2$CH$_2$SO$_3$M, and so forth.

The above-mentioned copolymeric monomers containing phosphates include, for example, the following monomers:

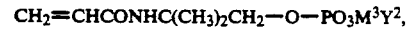

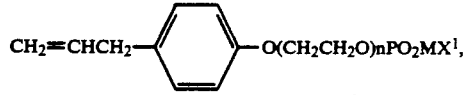

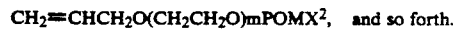

wherein M represents an alkali metal; R represents an alkyl group having 1 to 20 carbon atoms; Y$^1$ represents a hydrogen atom, M or CH$_2$=CHCH$_2$OCH$_2$CH(OH)CH$_2$—; Y$^2$ represents a hydrogen atom, M or CH$_2$CH=CONHC(CH$_3$)$_2$CH$_2$—: X$^1$ represents

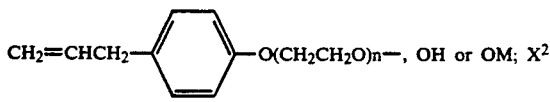

represents CH₂=CHCH₂O(CH₂CH₂O)m—, OH or OM, provided that m and n are each an integer of 1 to 100.

The copolymeric monomers which are copolymerized if required include, for example, vinyl ester, vinylidene chloride, acrylonitrile, methacrylonitrile, styrene, acrylic acid, methacrylic acid, acrylic acid ester, methacrylic acid ester, ethylene, propylene, isobutene, butadiene, isoprene, vinyl ether, allyl ether, allyl ester, acrylamide, methacrylamide, maleic acid, maleic acid ester and so forth.

The binders used in the invention are prepared by such a polymerizing method as emulsification polymerization, solution polymerization, suspension polymerization, block polymerization and so forth. In any of the above-mentioned methods, there can be applied, if required, a molecular weight regulator, an initiator, the known techniques such as an intermitent or continuous addition of monomers and so forth.

In such binders, the content of monomer containing the acid salt group is preferably 0.01 to 30 mol %. If the salt-containing monomer is too much, a solubility thereof to solvents is reduced and gelation is apt to cause. On the other hand, if the salt-containing monomer is too little, the prescribed characteristics can not be expected.

It is preferable that the vinyl chloride copolymers further contains an epoxy or hydroxyl group.

The, conventional vinyl chloride copolymers comprise of the following monomer units:

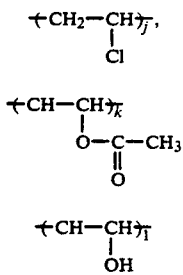

wherein j, k and l are each an integer.

It is, however, considered that CH₃CO—O— group hardly contributes to a cross linking reaction with a hardener or the like.

In this invention, it is therefore preferable to replace the CH₃CO group by an epoxy group such as

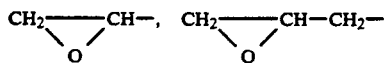

and so forth.

To be more concrete, the resins comprise of the following units:

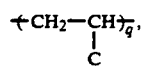

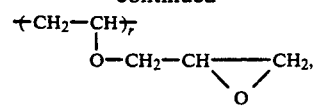

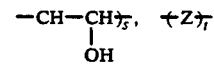

wherein q, r, s and t are each an integer; and Z represents a monomer unit containing an alkali metal salt of a sulfo or phospho group.

The molecular weight of the foregoing resin (A) is preferably 2000 to 70000 and, more preferably 4000 to 50000. If the molecular weight exceeds 70000, a viscosity of a magnetic paint increases over an allowable limit, and therefore, the objects of the invention may be missed. On the other hand, if the molecular weight is less than 2000, some portions of the resins, remain unreacted in a stage where a magnetic paint is cured with a hardener after after coating on a support, so that low molecular weight components may still be left to deteriorate the physical properties of a coated layer.

It is also preferable that the molecular weight of the resin (A) is 200 to 70000 per a polar group. If the molecular weight is less than 200 per a polar group, there may be lowered a solubility thereof to a solvent, a compatibility thereof with other resins contained in a binder, and a moisture resistance of a magnetic layer, because of too strong hydrophilic property. On the other hand, if the molecular weight per a polar group exceeds 70000, a dispersibility of a magnetic metal may be worse to an unsatisfactory level.

In this invention, a binder contains at least one kind of the resin (A). It is more preferable that it contains two or more kinds of the resin (A), because a dispersibility of a ferromagnetic metal powder contained in a magnetic layer can further be improved by using two or more kinds of the resin (A) in combination.

An addition ratio of the resin (A) is 5 to 40 parts by weight to 100 parts by weight of a ferromagnetic powder, and more preferably 10 to 30 parts by weight.

The addition ratio adjusted to the above-specified range can improve a dispersion rate as well as dispersibility of a ferromagnetic metal powder into a magnetic layer.

In the magnetic recording media of the invention, a binder is allowed to contain an another resin which may or may not have a polar group {hereinafter simply called 'resin (B)'} as well as the resin (A).

The expression, 'not having a polar group', means either that a binder does not contain at all any polar group which is particularly liable to adsorb to a surface of a ferromagnetic metal powder, or that an amount of such a polar group contained in a binder is so small that it does not substantially adsorb to magnetic powder.

The above-mentioned resin (B) has the functions that, in a magnetic recording media of the invention, the mechanical strength of the magnetic layer thereof is so enhanced as to improve a durability of a recording media, and that it prevents an increase in a friction coefficient of a smooth surface of a magnetic layer, which is attributable to the resin (A).

A glass transition temperature (Tg) of the resin (B) is preferably not lower than 25° C., and more preferably not lower than 45° C. If the glass-transition temperature (Tg) is lower than 25° C., a rigidity of a magnetic layer is lowered, so that there may be folded a tape edge in repeatedly running and caused a head clog.

The resin (B) preferably comprises an average molecular weight of about 10000 to 200000. Further, the resin (B) preferably comprises a polar group.

Among those resins, a urethane resin is preferable. A proportion of the resin (A) to the resin (B) as a urethane resin is 90 to 10 parts by weight, and preferably 80 to 20 parts by weight per 100 parts by weight of the resin (B).

In this invention, a durability of a magnetic layer can be improved by adding a polyisocyanate type hardener together with the above-mentioned resin into a binder.

The polyisocyanate type hardeners applicable thereto include, for example, bifunctional isocyanates such as tolylene diisocyanate, diphenylmethane diisocyanate, and so forth; trifunctional isocyanates such as Colonate L (manufacturer: Nippon Polyurethane Industries Co.), Desmodule L (manufacturer: Bayer AG), and so forth; conventional hardeners such as a urethane prepolymer containing isocyanate group at each of the both ends; and polyisocyanates which can be used as a hardener.

An amount of the hardener is normally 5 to 80 parts by weight per 100 parts by weight of a binder.

A proportion of the binder to the ferromagnetic metal powder is 1 to 200 parts and preferably 1 to 50 parts by weight per 100 parts by weight of the ferromagnetic metal powder.

If an amount of the binder compounded is too much, an amount of the ferromagnetic metal powder is relatively decreased, so that there may be lowered a recording density of the magnetic recording medium. If the amount thereof is too small, a strength of a magnetic layer is deteriorated, so that there may be lowered a running durability of the magnetic recording medium.

In a magnetic recording medium of the invention, there may be incorporated into a magnetic layer a lubricant, an abrasive, an antistatic agent and so forth.

The lubricants include, for example, solid lubricant such as carbon black, graphite, carbon black graft polymer, molybdenum disulfide, tungsten disulfide and so forth; silicone oil; modified silicone compound; fatty acid esters consisting of a monobasic fatty acid having 12 to 16 carbon atoms and an alcohol having 5 to 11 carbon atoms; a fatty acid having 12 to 22 carbon atoms; and so forth.

Among the above-given lubricants, carbon black and a combination of a fatty acid and an ester thereof are preferably used.

In the combination of the fatty acid and the ester thereof, the important is an addition amount and an addition status thereof. If these important points are improperly selected, a lubrication effect may not satisfactorily be displayed, and undesirable phenomena may arise, such as bleeding-out from a magnetic layer.

In this regard, the inventors have adopted a unique method to regulate the amounts of the fatty acid and the fatty acid esters eluted into cyclohexane in dipping a magnetic recording medium for prescribed time (three minutes) to investigate the extracted amounts of the fatty acid and the ester thereof in relation to highly fine magnetic metal powder. The inventors have consequently discovered that the very excellent results can be obtained by limiting the extracted amounts of the fatty acid and the ester thereof to a specific range. To be more concrete, according to the discovery, the amount of the fatty acid and the ester thereof present on a surface layer of a medium capable of substantially contributing to a lubrication effect can be regulated in relation to highly fine magnetic metal powder, and a synergism of the fatty acid and the ester thereof can offset the disadvantages in independent use to improve a lubrication effect, a running property, a running durability, a S/N ratio, head clogging, and edge folding.

An amount of the fatty acid extracted into cyclohexane is preferably not more than 4 mg per $m^2$ of a magnetic layer, and more preferably not less than 0.01 mg and not more than 3 mg. If the fatty acid is used in a smaller amount than this range, a lubricity is lowered and a running property of a medium is liable to be lowered, and in a larger amount, the fatty acid is liable to ooze out and an output is liable to be lowered.

An amount of a fatty acid ester extracted into cyclohexane is preferably not less than 5 mg and not more than 100 mg per $m^2$ of a magnetic layer, and, more preferably not less than 10 mg and not more than 80 mg. If the fatty acid ester is used in a smaller amount than this range, a still-life property is deteriorated, and in a larger amount, sticking of a tape in running and drop-off of powder occur.

In order to display the above-mentioned effects more excellently, a weight ratio of the fatty acid to the ester thereof extracted is preferably 0.01/100 to 80/100.

The fatty acid may be either monobasic or dibasic, and has preferably 6 to 30 carbon atoms, more preferably 12 to 22 carbon atoms. The examples of the fatty acid are:

(1) caproic acid,
(2) caprylic acid,
(3) capric acid.
(4) lauric acid,
(5) myristic acid,
(6) palmitic acid,
(7) stearic acid,
(8) linolenic acid.
(9) linolic acid,
(10) Oleic acid,
(11) behenic acid,
(12) malonic acid,
(13) succinic acid,
(14) maleic acid,
(15) glutaric acid,
(16) adipic acid, and
(17) sebacic acid, The examples of the fatty acid ester are:
(1) oleyl oleate,
(2) dioleyl maleate,
(3) butyl stearate,
(4) butyl palmitate,
(5) butyl myristate,
(6) octyl palmitate,
(7) amyl palmitate,
(8) lauryl oleate,
(9) octyl oleate,
(10) iosbutyl oleate,
(11) 2-ethylhexyl stearate,
(12) ethyl stearate,
(13) 2-ethylhexyl palmitate.
(14) butyl laurate,
(15) dioleyl adipate,
(16) diisobutyl adipate, and
(17) oleyl stearate A specific surface area is expressed by a BET value, i.e., a surface area per unit weight, and is a physical quantity quite different from an average grain size. For example, there exist ones having a wider specific surface area, while the others having a narrower specific surface area, even if both have the same average grain size. The specific surface area is measured in the following manner. First, powder is deaerated while heating at about 250° C. for 30 to 60 minutes so as to remove adsorbates from the powder. Next, it is introduced into a measurement instrument, and then an adsorption is measured with nitrogen at an initial nitrogen gas pressure of 0.5 kg/m² and a temperature of liquid nitrogen (at −195° C.). [This method for measuring a specific surface area is generally called a B.E.T. Method. For the details, refer to J. Ame. Chem. Soc. 60 309 (1938)]

In the invention, it is an important point that there is incorporated into a magnetic layer α-dialuminium trioxide. i.e., α-alumina, of which specific surface area is limited to a peculiar range, and the invention is characterized in a combination of the above-mentioned α-alumina and highly fine magnetic metal powder.

In other words, it is important that α-alumina is selected as a non-magnetic abrasive grain and that a specific surface area of α-alumina is limited to a specific range.

If this selection is improper, there can be any inconvenience in relation to highly fine magnetic metal powder. To be more concrete, a proper non-magnetic abrasive grains should be selected and a specific surface area thereof should also be limited in line with the specific surface area of a magnetic metal powder set at not less than 45 m²/g. As a matter of fact, such selection has been made by repeated experiments.

In this regard, the inventors have discovered that, when a magnetic layer is incorporated with α-alumina having a specific surface area within the range of not less than 11 m²/g to not more than 35 m²/g, it is possible to improve a running durability and a still-image stability of a magnetic recording medium as well as to prevent an unstable tape running called a stick-slipping, a powder dropping caused in repeated use, and a magnetic head clogging, while keeping such advantages as a high density recording and high electromagnetic conversion characteristics.

The reason why a specific surface area of α-alumina is to be not less than 11 m²/g is as follows.

If a specific surface area is less than 11 m²/g, a proportion of needle-like non-magnetic grains is increased and a magnetic layer surface is roughened by dispersion of the non-magnetic grains so as to space out between a head and the magnetic layer and thereby, the electromagnetic conversion characteristics attributable to a highly fine magnetic metal powder are badly affected, so that a running durability and a stability are also deteriorated.

The specific surface area of α-alumina larger than 35 m²/g results in a too flat surface of a magnetic layer, which is rather liable to deteriorate a running durability and stability and further to cause a head clogging due to an insufficient abrasion effect.

In the invention, a surface of a magnetic layer can suitably be roughened by jointly using α-alumina with a prescribed surface area and a highly fine magnetic metal powder, so that an output as well as a running stability can be enhanced by improving a surface property of the magnetic layer, without damaging excellent electromagnetic conversion characteristics and so forth.

It is further preferable that a specific surface area of α-alumina is not less than 15 m²/g and not more than 28 m²/g for more excellent effects.

An α-alumina content is preferably not more than 15 parts by weight per 100 parts by weight of a magnetic powder, and more preferably 5 to 12 parts by weight.

Further, in the invention, the following distinguished features are provided; a combination of α-dialuminium trioxide (α-alumina) and dichromium trioxide ($Cr_2O_3$) is selected as a non-magnetic abrasive; an average grain size of α-alumina is limited to not larger than 0.4 μm and that of dichromium trioxide is limited to not larger than 0.5 μm; and a weight ratio of α-alumina to $Cr_2O_3$ is limited to 15:85 to 85:15.

To be more concrete, foreign matters clogged in a magnetic head can effectively be removed as a whole by combined use of α-alumina and $Cr_2O_3$ due to a synergism of the peculiar cleaning functions of both additives.

In this regard, it is also important to limit the proportions of both non-magnetic abrasives to the rang which enables the respective cleaning functions to perform positively, and deviation from this range is liable to result in damaging a magnetic head or insufficiently cleaning it.

The limitation of the average grain sizes of α-alumina and $Cr_2O_3$ to not larger than 0.4 μm and not larger than 0.5 μm, respectively, makes it possible to preferably roughen a magnetic layer surface and to contribute to prevention of to a magnetic head clogging as well as improvement of a running property and durability while keeping high density recording and high electromagnetic conversion characteristics specific to a fine magnetic metal powder. Deviation from the above-mentioned range of an average grain size is liable to roughen a magnetic layer surface and deteriorate the electromagnetic conversion properties ought to be provided by a highly fine magnetic powder due to liability to spacing between a magnetic head and a recording medium. Further, the weight ratio of α-alumina and $Cr_2O_3$ limited to the foregoing range enables a magnetic layer surface to be preferably roughened, and more content of dichromium trioxide than this range tends to roughen further more a magnetic layer surface.

It is a further important point that a magnetic layer contains carbonblack having an average grain size of not smaller than 40 mμ and not larger than 400 mμ. The limitation of the average grain sizes to the above-mentioned ranges contributes effectively to improving a running property and electromagnetic conversion characteristics of a magnetic recording medium in relation to highly fine magnetic metal powder, and, along with the limitations of the average grain sizes of both α-alumina and dichromium trioxide, also to providing a recording medium enabling a highly fine magnetic metal powder to demonstrate more efficiently its specific characteristics.

In order to display more excellently the above-mentioned effects of the invention, it is preferred that; a specific surface area of a magnetic metal powder is not less than 50 m²/g; an average grain size of carbonblack is within the range of 40 to 350 mμ and the content thereof is within the range of 0.01 to 5 parts by weight per 100 parts of the magnetic powder, and more preferably 0.1 to 3 parts by weight.

An average grain size of α-alumina is preferably within the range of 0.1 to 0.3 μm, and that of dichromium trioxide preferably 0.1 to 0.4 μm; a weight ratio of α-alumina to dichromium trioxide is preferably 20:80 to 80:20; and a total content of both α-alumina and dichromium trioxide is preferably not more than 20 parts by weight per 100 parts by weight of a magnetic powder, and more preferably 5 parts by weight to 15 parts by weight.

Further, an average surface roughness Ra of a magnetic layer (an average roughness or a height of a center line of a surface unevenness) is preferably within the range of 0.005 to 0.011 $\mu$m. In other words, Ra of a magnetic layer limited to this range makes it possible to keep a running property good and to achieve a high output and high S/N because of less spacing loss between a magnetic head and a magnetic layer. Such an Ra range can be achieved by the constitution of the invention.

The above-mentioned antistatic agents include, for example, conductive powder such as carbon black, graphite, tin oxide-antimony oxide compound, tin oxide-titanium oxide-antimony oxide compound, carbon black graft polymer and the like; natural surfactants such as saponin and so forth; nonionic surfactants such as alkylene oxide, glycerol, glycidol and the like; cationic surfactants such as higher alkylamine, quaternary pyridine, other heterocyclic compounds, phosphonium and sulfonium salt and so forth; anionic surfactants containing acid group such as a carboxylic acid, sulfonic acid, phosphoric acid, sulfuric acid ester, phosphoric acid ester group and the like; amphoteric surfactants such as amino acid, aminosulfonic acid, sulfuric or phosphoric acid ester of aminoalcohol; and so forth.

These antistatic agents may be used independently or in combination.

The above-mentioned antistatic agents are compounded in an amount of 0.5 to 20 parts by weight per 100 parts by weight of a ferromagnetic metal powder.

The above-mentioned lubricants and antistatic agents not only display single functions, but also one single compound sometimes has the functions of both lubricant and antistatic agent.

Next, a method for manufacturing a magnetic recording medium of the invention will be detailed below.

Manufacturing method

A magnetic recording meadium of the invention can be manufactured in such a manner that the components for forming a magnetic layer such as a ferromagnetic metal powder, a binder and so forth are mixed and dispersed in a solvent to prepare a magnetic paint, which is then coated on a non-magnetic support and dried.

The solvents used for dispersion of the components for forming the magnetic layer include, for example, ketones such as acetone, methyl ethyl ketone (MEK), methyl isobutyl ketone (MIBK), cyclohexanone and so forth; alcohols such as methanol, ethanol, propanol, butanol and so forth; esters such as methyl acetate, ethyl acetate, butyl acetate, ethyl lactate, propyl acetate, ethyleneglycol monoacetate and so forth; ethers such as diethyleneglycol dimethylether, 2-ethoxy ethanol, tetrahydrofuran, dioxane and so forth; aromatic hydrocarbons such as benzene, toluene, xylene and so forth; and halogenated hydrocarbons such as methylene chloride, ethylene chloride, carbon tetrachloride, chloroform, ethylene chlorohydrin, dichlorobenzene and so forth.

In kneading the magnetic paint components a ferromagnetic metal powder and other magnetic paint components are put independently or simultaneously into a kneading machine. For example, first the ferromagnetic powder is added to a solution containing a dispersant and kneaded for a prescribed period of time. The remaining components are then added and further kneaded continuously to prepare a magnetic paint.

Various types of kneading machines can be used; for example, a dual-roll mill, a triple-roll mil, a ball-mill, a pebble-mill, a side grinder, a Sqegvari attriter, a high-speed impeller dispersing machine, a high-speed stone-mill, a high- speed impact-mill, a disper-kneader, a high-speed mixer, a homogenizer, a ultrasonic dispersing machine and so forth.

For kneading and dispersing a ferromagnetic metal powder, a dispersant may be used.

Such dispersants include, for example, lecithin, phosphoric acid ester, amine compound, alkyl sulfate, fatty acid amide, higher alcohol, polyethylene oxide, sulfosuccinic acid, sulfosuccinic acid ester, known surfactant and the salts thereof, polymeric dispersants having salts of negative organic group such as —COO, —PO$_3$ and so forth.

The dispersants may be used either independently or in combination.

The dispersants are added in an amount of 1 to 20 parts by weight per 100 parts by weight of a ferromagnetic metal powder.

The coating solutions thus prepared are coated on a non-magnetic support by conventional methods.

The coating methods applicable to the invention include, for example, gravure-roll coating, wire-bar coating, doctor-blade coating, reverse-roll coating, dip coating, air-knife coating, calender coating, squeeze coating, kiss coating, fountain coating and the like.

A dry thickness of a magnetic layer coated is ordinarily 1 to 10 $\mu$m.

After coating the components for forming a magnetic layer, if required, a magnetic-field orientation treatment is applied while the layer remains undried. Further, a surface smoothing treatment is ordinarily applied by a super-calender roll or the like.

Next, a treated medium is cut to a desired shape to obtain a magnetic recording medium.

The magnetic recording media of the invention can serve as magnetic tapes such as a video tape, an audio tape and the like by cutting them to a long roll shape, or as floppy disks and so forth by cutting them to a disk shape. They may also be used in such a shape as a card, a cylinder and so forth like a normal type magnetic recording media.

EXAMPLES

Next, the examples of the invention and the comparisons will be given to further detail the invention. In the following examples and comparisons, the terms 'part' means 'part by weight'.

EXAMPLE 1

The following components for a magnetic layer were mixed and dispersed by making use of a ball-mill for 48 hours to make a dispersed solution, and 5 parts of a polyisocyanate compound (brand name, 'Colonate L', manufactured by Nippon Polyurethane Co.) were added and mixed to prepare a magnetic paint.

| | |
|---|---|
| Fe—Al type ferromagnetic metal powder (Al content: about 5%; adsorbed moisture: 1.0%) | 100 parts |
| Vinyl chloride polymer having sulfonate group | 10 parts |
| Polyurethane resin (without polar group) | 15 parts |
| $\alpha$-Al$_2$O$_3$ (average grain size: 0.2 $\mu$m) | 7 parts |

-continued

| | |
|---|---|
| Stearic acid | 2 parts |
| Butyl stearate | 1 part |
| Methyl ethyl ketone | 200 parts |
| Toluene | 200 parts |

Thus prepared magnetic paint was coated on a 10 μm-thick polyethylene terephthalate film to a dry thickness of 3 μm.

Next, after heating to remove a solvent the coated film was subjected to a super calender treatment for surface smoothing, and was cut to 8 mm width to make 8 mm-wide video tapes.

The various characteristics of the 8 mm video tapes were measured.

The results are shown in Table 1.

The characteristics were measured in the following manners, respectively;

Paint viscosity;
measured with a B-type rotary viscometer with a #4 rotor at 30 r.p.m.

Rectangular ratio;
a ratio of a residul flux density (Br) to a saturation flux density (Bm), Br/Bm, measured with vsm in a magnetic field of 10 KOe.

Lumi-S/N;
a deviation of S/N of the respective samples from that of Comparison 1 as a standard was measured with a noise meter manufactured by shibasoku Co. on a 100% white signal.

Head clogging;
after carrying out recording and playback over a whole length of each tape, it was inspected whether a RF-DOT was lowered or not by head clogging, and the results were classified into the following 4 grades;

Grade 1: particularly excellent;
Grade 2: good, no clogging found;
Grade 3: clogging in a moment;
Grade 4: clogging for a long time.

Powder dropping: after running 100 times at 40° C. and 80% RH, contamination on each tape was inspected. The results were classified into the following 4 grades;

Grade 1: no contamination at all:
Grade 2: almost no contamination was found;
Grade 3: some contamination was found:
Grade 4: considerable contamination was found.

EXAMPLES 2 TO 6 AND COMPARISONS 1 TO 6

The, video tapes were prepared in the same manner as in Example 1 with a ferromagnetic powder and/or a resin (A) shown in Table 2. The characteristics of the video tapes were measured, of which results are shown in Table 1.

As is obvious from Table 1, the followings have been confirmed; a viscosity increase of the magnetic paint prepared according to the invention can be controlled very well even after aging; preservability of the magnetic paint of the invention is excellent; further, the electromagnetic conversion properties and a running durability of the magnetic recording medium of the invention are superior to those of the comparisons.

TABLE 1

| | Paint viscosity (CP) | | Rectangular ratio | Lumi-S/N (dB) | Head clog | Powder drop |
|---|---|---|---|---|---|---|
| | Immediately after milling | After standing for 24 hours | | | | |
| Example 1 | 2300 | 2000 | 0.85 | +1.5 | 2 | 1 |
| Example 2 | 1800 | 1700 | 0.83 | +2.0 | 1 | 2 |
| Example 3 | 2350 | 2300 | 0.84 | +2.0 | 2 | 2 |
| Example 4 | 1950 | 1850 | 0.82 | +2.5 | 1 | 1 |
| Example 5 | 2200 | 2250 | 0.82 | +1.5 | 1 | 2 |
| Example 6 | 1980 | 2000 | 0.83 | +2.0 | 2 | 1 |
| Comparison 1 | 1750 | 2450 | 0.82 | 0 | 3 | 2 |
| Comparison 2 | 1800 | 3200 | 0.80 | 0.5 | 4 | 3 |
| Comparison 3 | 1900 | 1700 | 0.76 | 0 | 4 | 3 |
| Comparison 4 | 2200 | 2100 | 0.75 | 0.5 | 3 | 4 |
| Comparison 5 | 2100 | 3400 | 0.75 | 0 | 4 | 4 |
| Comparison 6 | 2000 | 2200 | 0.70 | −0.5 | 4 | 4 |

TABLE 2

| | Ferromagnetic powder | | | | |
|---|---|---|---|---|---|
| | Type | Specific surface area (BET) | pH | Moisture content (wt %) | Resin Type |
| Example | | | | | |
| 1 | Fe—Al | 45 | 9.5 | 1.0 | Vinyl chloride resin having sulfonic acid group |
| 2 | Fe—Al | 53 | 10.0 | 1.0 | Vinyl chloride resin having sulfonic acid group |
| 3 | Fe—Al | 53 | 10.3 | 1.5 | Vinyl chloride resin having sulfonic acid group |
| 4 | Fe—Al | 53 | 10.1 | 2.5 | Vinyl chloride resin having sulfonic acid group |
| 5 | Fe—Al | 53 | 10.1 | 1.5 | Urethane resin having sulfonic acid group |
| 6 | Fe—Al—Ni | 53 | 9.8 | 1.5 | Vinyl chloride resin having |

TABLE 2-continued

| | Ferromagnetic powder | | | |
|---|---|---|---|---|
| | Type | Specific surface area (BET) | pH | Moisture content (wt %) | Resin Type |

| | | | | | sulfonic acid group |
|---|---|---|---|---|---|
| Comparison | | | | | |
| 1 | Fe—Al | 42 | 10.3 | 1.0 | Vinyl chloride resin having sulfonic acid group |
| 2 | Fe—Al | 53 | 10.2 | 0.7 | Vinyl chloride resin having sulfonic acid group |
| 3 | Fe—Al | 53 | 9.5 | 2.7 | Vinyl chloride resin having sulfonic acid group |
| 4 | Fe—Al | 53 | 9.5 | 1.5 | Uretane resin without a polar group |
| 5 | Fe—Al | 53 | 8.5 | 1.5 | Vinyl chloride resin having sulfonic acid group |
| 6 | Fe—Al | 53 | 11.8 | 1.5 | Vinyl chloride resin having sulfonic acid group |

EXAMPLES 7 TO 11 AND COMPARISONS 7 to 10

The samples of the video tapes were prepared in the same manner as in Example 1 by providing the magnetic layers containing the components shown in Table 3 on a 10 μm thick polyethylene terephthalate film base.

Then, a paint of the following composition was coated to a dry thickness of 0.4 μm on an opposite side of the magnetic layer to form a BC layer.

| | |
|---|---|
| carbonblack (average grain size: 50 mμ) | 40 parts |
| barium sulfate | 10 parts |
| nitrocellulose | 25 parts |
| N-2301, manufactured by Japan Urethane Co. | 25 parts |
| Colonate L, manufactured by Japan Urethane Co. | 10 parts |
| cyclohexanone | 400 parts |
| methyl ethyl ketone | 250 parts |
| toluene | 250 parts |

The wide magnetic film thus prepared with the magnetic layer and BC layer each having prescribed thickness was cut to 8 mm width to prepare the video tapes. In Table 3, the values shown in the columns following the 2nd one are expressed in terms of parts by weight.

For measuring a frequency of scratches on a tape, a video tape of ½ inch width 12.65 mm was used.

The respective video tapes were evaluated in the following manners, and the results are shown in Table 3.

Extraction by cyclohexane: indicated by mg of a fatty acid and an ester thereof per m² of a magnetic layer, which was extracted in cyclohexane by dipping a magnetic tape therein for 3 minutes.

Luminance S/N ratio: measured in the same manner as Example 1, except that Comparison 10 was set as a standard.

Still image life: time until a still image was lowered by 2 dB; the larger the values, the higher the durability and abrasion resistance of a magnetic recording medium.

Frequency of scratches: inspected visually the tapes after running for one minute on a VHS type VTR commercially available, and the frequency of scratches was determined by the following equation;

$$\text{Frequency of scratches} = \text{Number of scratches} / \text{Number of tests} \times 100\ (\%)$$

The number of tests was not less than 20 times.

Saturation magnetization: shown in terms of Gauss unit.

Powder dropping: measured in the same manner as in Example 1.

Magnetic head: clogging measured in the same manner as in Example 1.

Edge folding: inspected tapes after running 200 paths on a video deck at an atmosphere of 23° C./60% RH.

Dynamic friction coefficient: measured in the following condition with a running tester, TBT-300D made by Yokohama System Laboratory; a tape wound 180 degrees round a 4φ chromium-plated stainless-steel pin; tape speed: 1 cm/sec; inlet tension: 20g; temperature: 25° C.; then, μk was calculated by the following equation;

$$\mu k = 1/\pi \ n \ X/20 \ (X \ldots \text{exit tension, g})$$

It can be found from the results shown in Table 3 that the properties of a magnetic tape prepared in accordance with the invention can remarkably be improved and that it is essential for the invention to limit a BET value of a magnetic metal powder to not less than 45 m²/g and the amounts of both fatty acid and ester thereof extracted by cyclohexane to the prescribed levels.

TABLE 3

| Magnetic paint component/Characteristics | Example 7 | Example 8 | Example 9 | Example 10 | Example 11 | Comparison 7 | Comparison 8 | Comparison 9 | Comparison 10 |
|---|---|---|---|---|---|---|---|---|---|
| Magnetic metal powder Component | 100 parts Fe—Al | 100 parts Fe—Al | 100 parts Fe—Al | 100 parts Fe—Al—Ni | 100 parts Fe—Al | 100 parts Fe—Al | 100 parts Fe—Al | 100 parts Fe—Al | 100 parts Fe—Al |
| BET value | 45 m²g | 52 m²g | 45 m²g | 52 m²g | 52 m²g | 45 m²g | 45 m²g | 45 m²g | 41 m²g |
| Adsorbed moisture wt % | 1.0 | 1.0 | 1.1 | 1.2 | 1.3 | 1.0 | 0.8 | 1.0 | 1.5 |
| pH | 9.5 | 10.0 | 10.5 | 9.5 | 10.8 | 9.3 | 9.5 | 9.5 | 9.0 |

TABLE 3-continued

| Magnetic paint component/Characteristics | Example 7 | Example 8 | Example 9 | Example 10 | Example 11 | Comparison 7 | Comparison 8 | Comparison 9 | Comparison 10 |
|---|---|---|---|---|---|---|---|---|---|
| Vinyl chloride copolymer | 13 parts *1 | 13 parts *3 | 13 parts *1 | 13 parts *3 | 13 parts *1 | 13 parts *1 | 13 parts *1 | 13 parts[3] *3 | 13 parts |
| Polyurethane | 10 parts *2 | 10 parts *2 | 10 parts *4 | 10 parts *4 | 10 parts *2 | 10 parts *2 | 10 parts *4 | 10 parts[2] *2 | 10 parts |
| α-Alumina, 0.2 μm | 9 parts | 9 parts | 9 parts | 9 parts | 9 parts | 9 parts | 9 parts | 9 parts | 9 parts |
| Methyl ethyl ketone | 250 parts | 250 parts | 250 parts | 250 parts | 250 parts | 250 parts | 250 parts | 250 parts | 250 parts |
| Toluence | 200 parts | 200 parts | 200 parts | 200 parts | 200 parts | 200 parts | 200 parts | 200 parts | 200 parts |
| Amount extracted by cyclohexane | | | | | | | | | |
| Oleic acid, mg/m$^2$ | 2 | 0.1 | 0.2 | 0.2 | 2 | 2 | 3 | 2 | 2 |
| Stearic acid, mg/m$^2$ | 1 | 0.2 | 0.6 | 0.4 | 2 | 4 | 3 | 1 | 1 |
| Butyl stearic, mg/m$^2$ | 10 | 5 | 60 | 80 | 80 | 80 | 150 | 2 | 10 |
| Lumi. S/N, dB | 1.5 | 2.5 | 1.5 | 2.0 | 2.3 | 1.0 | 1.5 | 0.5 | 0 |
| Still image life, min | >120 | >120 | >120 | >120 | >120 | >120 | >120 | 25 | 100 |
| Scratch frequency on tape, % | 5 | 0 | 5 | 10 | 5 | 60 | 35 | 50 | 70 |
| Saturation magnetization, Gauss | 2350 | 2450 | 2400 | 2500 | 2450 | 2350 | 2250 | 2100 | 1950 |
| Powder dropping | Excellent | Good | Excellent | Excellent | Good | Fair | Poor | Poor | Poor |
| Magnetic head clogging | Nil | Nil | Nil | Nil | Nil | Yes | Yes | Nil | Yes |
| Edge folding | Nil | Nil | Nil | Nil | Nil | Nil | Yes | Yes | Nil |
| Dynamic friction coefficient | 0.20 | 0.23 | 0.22 | 0.25 | 0.19 | 0.27 | 0.35 | 0.22 | 0.24 |

*1 ... Vinyl chloride copolymer having sodium sulfonate group.
*2 ... Polyurethane having potassium sulfonate group.
*3 ... Vinyl chloride copolymer having sodium phosphate group.
*4 ... Polyurethane having sodium phosphate group

EXAMPLES 12 TO 15 AND COMPARISONS 11 TO 14

The samples of the video tapes were prepared in the same manner as in Example 1 by providing the magnetic layers containing the components shown in Table 4 on a 10 μm thick polyethylene terephthalate film base. Then, a paint of the following composition was coated to a dry thickness of 0.4 μm on an opposite side of the magnetic layer to form a BC layer.

| | |
|---|---|
| carbonblack (average grain size: 50 mμ) | 40 parts |
| barium sulfate | 10 parts |
| nitrocellulose | 25 parts |
| N-2301, manufactured by Japan Urethane Co. | 25 parts |
| Colonate L, manufactured by Japan Urethane Co. | 10 parts |
| cyclohexanone | 400 parts |
| methyl ethyl ketone | 250 parts |
| toluene | 250 parts |

The wide magnetic film thus prepared with the magnetic layer and BC layer each having prescribed thickness was cut to 8 mm width to prepare the video tapes. In Table 4, the values shown in the columns following the 2nd column are expressed in terms of parts by weight.

For measuring a frequency of scratches on a tape. a video tape of ½ inch width (12.65 mm) was used.

The respective video tapes were evaluated in the following manners, and the results are shown in Table 4.

Average surface roughness Ra:

measured with a 3-dimensional surface roughness meter, 3FK manufactured by Kosaka Laboratories Ltd. at a cut-off value of 0.25 mm.

Luminance S/N ratio:

measured in the same manner as in Example 1, except that Comparison 11 was set as a standard.

Still-image life:

determined in the same manner as in Example 7; the larger the values, the higher the durability and abrasion resistance of a magnetic recording medium.

Frequency of scratches:

determined in the same manner as Example 7.

Running property:

inspected powder dropping and magnetic head clogging after running a tape continuously for 200 hours at 40° C. and 80% RH on a video deck.

Stick slipping:

measured a variation of a dynamic friction coefficient.

Dynamic friction coefficient:

measured in the same manner as Example 7.

It can be found from the results shown in Table 4 that the properties of a magnetic tape prepared in accordance with the invention can remarkably be improved and that it is essential for the invention to limit a BET value of a magnetic metal powder to not less than 45 m$^2$/g, and a specific surface area of α-alumina to the range of not less than 11 m$^2$/g to not more than 35 m$^2$/g.

TABLE 4

| Magnetic paint component/Characteristics | Example 12 | Example 13 | Example 14 | Example 15 | Comparison 11 | Comparison 12 | Comparison 13 | Comparison 14 |
|---|---|---|---|---|---|---|---|---|
| Magnetic metal powder Component | 100 parts Fe—Al | 100 parts Fe—Al | 100 parts Fe—Al | 100 parts Fe—Al—Ni | 100 parts Fe—Al | 100 parts Fe—Al | 100 parts Fe—Al | 100 parts Fe—Al |
| BET value | 52 m$^2$g | 45 m$^2$g | 52 m$^2$g | 52 m$^2$g | 42 m$^2$g | 52 m$^2$g | 52 m$^2$g | 52 m$^2$g |

TABLE 4-continued

| Magnetic paint component/Characteristics | Example 12 | Example 13 | Example 14 | Example 15 | Comparison 11 | Comparison 12 | Comparison 13 | Comparison 14 |
|---|---|---|---|---|---|---|---|---|
| Adsorbed moisture wt % | 1.0 | 1.0 | 1.3 | 1.2 | 0.8 | 1.5 | 1.3 | 1.2 |
| pH | 9.9 | 10.3 | 9.5 | 9.3 | 10.0 | 9.0 | 9.0 | 8.0 |
| Vinyl chloride copolymer | 13 parts *1 | 13 parts *1 | 13 parts *3 | 13 parts *3 | 13 parts *1 | 13 parts *1 | 13 parts *1 | 13 parts |
| Polyurethane | 10 parts *2 | 10 parts *4 | 10 parts *2 | 10 parts *4 | 10 parts *4 | 10 parts *3 | 10 parts *2 | 10 parts |
| α-Alumina, Specific surface area: $m^2g$ | 9 parts 11 | 9 parts 11 | 9 parts 25 | 9 parts 11 | 9 parts 11 | 9 parts 8 | 9 parts 40 | $Cr_2O_3$ 13 |
| Methyl ethyl ketone | 250 parts | 250 parts | 250 parts | 250 parts | 250 parts | 250 parts | 250 parts | 250 parts |
| Toluence | 200 parts | 200 parts | 200 parts | 200 parts | 200 parts | 200 parts | 200 parts | 200 parts |
| Oleic acid | 2 parts | 2 parts | 2 parts | 2 parts | 2 parts | 2 parts | 2 parts | 2 parts |
| Stearic acid | 2 parts | 2 parts | 2 parts | 2 parts | 2 parts | 2 parts | 2 parts | 2 parts |
| Butyl stearic | 1 part | 1 part | 1 part | 1 part | 1 part | 1 part | 1 part | 1 part |
| Average surface roughness, μm | 0.009 | 0.011 | 0.009 | 0.009 | 0.010 | 0.010 | 0.007 | 0.009 |
| Lumi. S/N, dB | 1.5 | 1.0 | 1.0 | 1.5 | 0 | 0.5 | 0.5 | 0 |
| Still image life, min | >120 | >120 | >120 | >120 | 30 | 60 | 20 | 45 |
| Scratch frequency on tape, % | 0 | 5 | 10 | 5 | 30 | 5 | 10 | 15 |
| Running property | Excellent | Good | Excellent | Excellent | Fair | Fair | Poor | Poor |
| Stick-slipping | Excellent | Excellent | Excellent | Excellent | Fair | Fair | Poor | Fair |

*1 ... Vinyl chloride copolymer having sodium sulfonate group.
*2 ... Polyurethane having potassium sulfonate group.
*3 ... Vinyl chloride copolymer having Sodium phosphate group.
*4 ... Polyurethane having sodium phosphate group

EXAMPLES 16 TO 22 AND COMPARISONS 15 TO 20

A magnetic layer was provided on a 10 μm-thick film support of polyethylene terephthalate in the following manner.

The components shown in Table 5 including a magnetic powder were dispersed and filtrated through a 1 μm filter to prepare a magnetic paint, to which 5 parts of multifunctional isocyanate was then added. The magnetic paint was coated on a support to 2.5 μm thickness, and the coated support was subjected to a super calendar treatment to form the magnetic layer having the composition shown in Table 5; provided that an aluminium content of a magnetic metal powder was set at 5 atomic %.

Then, a paint for a BC layer having the following composition was coated on an opposite side of the magnetic layer to dry thickness of 0.4 μm to prepare the tape samples shown in Table 5.

| | |
|---|---|
| carbonblack (average grain size: 50 mμ) | 40 parts |
| barium sulfate | 10 parts |
| nitrocellulose | 25 parts |
| N-2301, manufactured by Japan Urethane Co. | 25 parts |
| Colonate L, manufactured by Japan Urethane Co. | 10 parts |
| cyclohexanone | 400 parts |
| methyl ethyl ketone | 250 parts |
| toluene | 250 parts |

The wide magnetic film thus prepared was cut to 8 mm width to prepare the video tapes.

For measuring a frequency of scratches, a video tapes of a ½ inch Width (12.65 mm) was used.

Table 5 shows the evaluation results of the respective tapes. The evaluation items were measured in the same manner as in the preceding examples.

It can be found from the results shown in Table 5 that the properties of a magnetic tape prepared in accordance with the invention can remarkably be improved and that it is essential for the invention to limit a BET value of magnetic metal powder to not less than 45 $m^2/g$, an average grain size of carbonblack to 40 to 400 mμ, an average grain size of α-alumina to not larger than 0.5 μm, and a ratio of α-alumina to dichromium trioxide to a prescribed level, respectively.

TABLE 5

| Magnetic paint component/Characteristics | Example 16 | Example 17 | Example 18 | Example 19 | Example 20 | Example 21 | Example 22 |
|---|---|---|---|---|---|---|---|
| Magnetic metal powder | 100 parts | 100 parts | 100 parts | 100 parts | 100 parts | 100 parts | 100 parts |
| Component | Fe—Al | Fe—Al | Fe—Al | Fe—Al | Fe—Al | Fe—Al | Fe—Al—Ni |
| BET value | 52 $m^2g$ | 52 $m^2g$ | 52 $m^2g$ | 52 $m^2g$ | 52 $m^2g$ | 45 $m^2g$ | 52 $m^2g$ |
| Adsorbed moisture wt % | 1.0 | 1.2 | 1.3 | 1.0 | 1.5 | 1.0 | 1.1 |
| pH | 9.5 | 10.5 | 10.8 | 10.0 | 10.9 | 10.3 | 9.5 |
| Vinyl chloride copolymer | 13 parts *1 | 13 parts *1 | 13 parts *3 | 13 parts *3 | 13 parts *1 | 13 parts *3 | 13 parts *1 |
| Polyurethane | 10 parts *2 | 10 parts *4 | 10 parts *2 | 10 parts *2 | 10 parts *4 | 10 parts *4 | 10 parts *2 |
| α-Alumina, average size: μm | 8 parts 0.2 | 5 parts 0.2 | 2 parts 0.2 | 8 parts 0.2 | 8 parts 0.4 | 8 parts 0.4 | 5 parts 0.2 |
| $Cr_2O_3$, ave. size: μm | 2 parts 0.3 | 5 parts 0.3 | 8 parts 0.3 | 2 parts 0.3 | 2 parts 0.5 | 2 parts 0.5 | 5 parts 0.3 |
| Content ratio, by wt. α-$Al_2O_3$:$Cr_2O_3$ | 80:20 | 50:50 | 20:80 | 80:20 | 80:20 | 80:20 | 50:50 |
| Carbon black, average size: μm | 2 parts 50 | 2 parts 50 | 2 parts 50 | 1 part 350 | 1 part 150 | 1 part 150 | 2 parts 40 |

TABLE 5-continued

| | | | | | | | |
|---|---|---|---|---|---|---|---|
| Methyl ethyl ketone | 250 parts | 250 parts | 250 parts | 250 parts | 250 parts | 250 parts | 250 parts |
| Toluence | 200 parts | 200 parts | 200 parts | 200 parts | 200 parts | 200 parts | 200 parts |
| Oleic acid, mg/m$^2$ | 1 part | 1 part | 1 part | 1 part | 1 part | 1 part | 1 part |
| Stearic acid, mg/m$^2$ | 1 part | 1 part | 1 part | 1 part | 1 part | 1 part | 1 part |
| Butyl stearic, mg/m$^2$ | 1 part | 1 part | 1 part | 1 part | 1 part | 1 part | 1 part |
| Average surface roughness Ra, μm | 0.007 | 0.008 | 0.007 | 0.006 | 0.008 | 0.009 | 0.007 |
| Lumi. S/N, dB | 1.5 | 1.0 | 1.5 | 2.0 | 1.0 | 1.5 | 1.5 |
| Still image life, min | >120 | >120 | >120 | >120 | >120 | >120 | >120 |
| Scratch frequency on tape, % | 5 | 10 | 5 | 0 | 5 | 10 | 0 |
| Powder dropping | Excellent | Excellent | Good | Excellent | Excellent | Excellent | Good |
| Magnetic head clogging | Excellent | Excellent | Excellent | Excellent | Excellent | Excellent | Excellent |

| Magnetic paint component/Characteristics | Comparison 15 | Comparison 16 | Comparison 17 | Comparison 18 | Comparison 19 | Comparison 20 |
|---|---|---|---|---|---|---|
| Magnetic metal powder | 100 parts | 100 parts | 100 parts | 100 parts | 100 parts | 100 parts |
| Component | Fe—Al | Fe—Al | Fe—Al | Fe—Al | Fe—Al | Fe—Al |
| BET value | 52 m$^2$g | 52 m$^2$g | 52 m$^2$g | 42 m$^2$g | 52 m$^2$g | 52 m$^2$g |
| Adsorbed moisture wt % | 1.8 | 0.7 | 0.9 | 2.0 | 1.3 | 1.0 |
| pH | 9.0 | 9.5 | 10.0 | 9.5 | 9.5 | 9.5 |
| Vinyl chloride copolymer | 13 parts *1 | 13 parts *1 | 13 parts *1 | 13 parts *3 | 13 parts *1 | 13 parts *1 |
| Polyurethane | 10 parts *2 | 10 parts *2 | 10 parts *4 | 10 parts *4 | 10 parts *2 | 10 parts |
| α-Alumina, average size: μm | 10 parts 0.2 | 0 parts — | 8 parts 0.2 | 8 parts 0.2 | 8 parts 0.6 | 8 parts 0.4 |
| Cr$_2$O$_3$, ave. size: μm | 0 parts — | 10 parts 0.4 | 2 parts 0.4 | 2 parts 0.4 | 2 parts 0.4 | 2 parts 0.6 |
| Content ratio, by wt. α-Al$_2$O$_3$:Cr$_2$O$_3$ | 100:0 | 0:100 | 80:20 | 80:20 | 80:20 | 80:20 |
| Carbon black, average size: μm | 2 parts 50 | 2 parts 50 | 2 parts 20 | 2 parts 50 | 2 parts 50 | 2 parts 50 |
| Methyl ethyl ketone | 250 parts | 250 parts | 250 parts | 250 parts | 250 parts | 250 parts |
| Toluence | 200 parts | 200 parts | 200 parts | 200 parts | 200 parts | 200 parts |
| Oleic acid, mg/m$^2$ | 1 part | 1 part | 1 part | 1 part | 1 part | 1 part |
| Stearic acid, mg/m$^2$ | 1 part | 1 part | 1 part | 1 part | 1 part | 1 part |
| Butyl stearic, mg/m$^2$ | 1 part | 1 part | 1 part | 1 part | 1 part | 1 part |
| Average surface roughness Ra, μm | 0.009 | 0.010 | 0.010 | 0.013 | 0.016 | 0.012 |
| Lumi. S/N, dB | 0.5 | −0.5 | −0.5 | 0 | 0.5 | 0.5 |
| Still image life, min | 90 | >120 | >120 | >120 | 100 | 100 |
| Scratch frequency on tape, % | 30 | 25 | 15 | 30 | 15 | 20 |
| Powder dropping | Fair | Fair | Poor | Poor | Fair | Poor |
| Magnetic head clogging | Fair | Poor | Poor | Poor | Fair | Fair |

*1 ... Vinyl chloride copolymer having sodium sulfonate group.
*2 ... Polyurethane having potassium sulfonate group.
*3 ... Vinyl chloride copolymer having potassium phosphate group.
*4 ... Polyurethane having sodium phosphate group

What is claimed is:

1. A magnetic recording medium comprising a support having provided thereon a magnetic layer, said magnetic layer containing;

(1) a ferromagnetic powder having an adsorbed moisture content of 1.0% to 2.5% by weight based on said ferromagnetic powder,
a specific surface area of at least 45 m$^2$/g as measured by the BET method, and
a pH value of 9.0 to 11.5, (2) α-alumina having a BET specific surface area of 11 m$^2$/g to 35 m$^2$/g; and (3) a binder resin having at least one polar group selected form the group consisting of

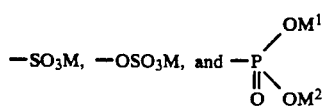

wherein M represents hydrogen, lithium, sodium, or potassium; and M$^1$ and M$^2$ each represents hydrogen, lithium, sodium, potassium, or an alkyl group, said resin having a molecular weight of 2,000 to 70,000, the molecular weight of said resin is 200 to 70,000 per polar group.

2. The recording medium of claim 1 wherein the moisture content is 1.0 to 2.0% by weight.

3. The recording medium of claim 1 wherein the surface area is at least 50 m$^2$/gram.

4. The recording medium of claim 1 wherein the pH is 9.5 to 10.5.

5. The recording medium of claim 1 wherein the specific surface area of α-alumina is 15 m$^2$/gram to 28 m$^2$/gram.

6. The recording medium of claim 1 wherein the binder resin comprises a vinyl chloride copolymer, polyurethane, polyester, or polycarbonate each having said polar group.

7. The recording medium of claim 1 wherein the ferromagnetic powder contains aluminum or nickel.

8. The recording medium of claim 1 wherein the magnetic layer further contains Cr$_2$O$_3$ having an average particle size not larger than 0.5 μm.

9. The recording medium of claim 1 wherein the magnetic layer further contains carbon black having an average particle size of 40 μm to 400 μm.

10. A magnetic recording medium comprising a support having a magnetic layer provided thereon, said magnetic layer containing;
  (1) a ferromagnetic powder having an adsorbed moisture content of 1.0% to 2.5% by weight based on said ferromagnetic powder, and a specific surface area of at least 45 m²/g as measured by the BET method and a pH value of 9.0–11.5;
  (2) alpha alumina having a BET specific surface area of 11 m²/g to 35 m²/g,
  (3) a fatty acid in an amount of not more than 4 mg/m², and a fatty acid ester in an amount of 5 mg/m² to 100 mg/m² based on said recording medium, as determined by extraction dipping said medium in cyclohexane for three minutes; and
  (4) a binder resin having at least one polar group selected from the group consisting of;

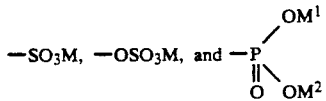

wherein M represents hydrogen, lithium, sodium, or potassium; and $M^1$ and $M^2$ each represent hydrogen, lithium, sodium, potassium, or an alkyl group, said resin having a molecular weight of 2,000 to 70,000, and each polar group having a molecular weight of 200 to 70,000.

11. The recording medium of claim 10 wherein the moisture content is 1.0 to 2.0% by weight.

12. The recording medium of claim 10 wherein the specific surface area is at least 50 m²/gram.

13. The recording medium of claim 10 wherein the pH of the ferromagnetic powder is 9.5 to 10.5.

14. The recording medium of claim 10 wherein the amount of fatty acid is 0.01 mg/m² to 3 mg/m², and the amount of fatty acid ester is 10 mg/m² to 80 mg/m².

15. The recording medium of claim 10 wherein the binder resin comprises a vinyl chloride copolymer, polyurethane, polyester, or polycarbonate each having said polar group.

16. The recording medium of claim 10 wherein the ferromagnetic powder contains aluminum or nickel.

17. The recording medium of claim 10 wherein the magnetic layer further contains $Cr_2O_3$ having an average particle size not larger than 0.5 μm.

18. The recording medium of claim 10 wherein the magnetic layer further contains carbon black having an average particle size of 40 μm to 400 μm.

* * * * *